(12) United States Patent
Gourishankar et al.

(10) Patent No.: US 12,441,084 B2
(45) Date of Patent: Oct. 14, 2025

(54) THERMAL INSULATION SYSTEM

(71) Applicant: Unison Industries, LLC, Jacksonville, FL (US)

(72) Inventors: Karthick Vilapakkam Gourishankar, Bengaluru (IN); Mohandas Nayak, Bengaluru (IN); Dattu Guru Venkata Jonnalagadda, Bengaluru (IN); Emily Marie Phelps, Xenia, OH (US); Navish Garg, Bengaluru (IN); Soumya Chakraborty, Bengaluru (IN); Gordon C. Tajiri, Waynesville, OH (US)

(73) Assignee: Unison Industries, LLC, Jacksonville, FL (US)

( * ) Notice: Subject to any disclaimer, the term of this patent is extended or adjusted under 35 U.S.C. 154(b) by 199 days.

(21) Appl. No.: 17/851,800

(22) Filed: Jun. 28, 2022

(65) Prior Publication Data
US 2023/0117007 A1 Apr. 20, 2023

(30) Foreign Application Priority Data
Oct. 20, 2021 (IN) .............................. 202111047592

(51) Int. Cl.
| | |
|---|---|
| B32B 15/04 | (2006.01) |
| B32B 5/02 | (2006.01) |
| B32B 15/08 | (2006.01) |
| B32B 15/14 | (2006.01) |
| B32B 15/18 | (2006.01) |
| B32B 15/20 | (2006.01) |
| B32B 18/00 | (2006.01) |

(Continued)

(52) U.S. Cl.
CPC .............. *B32B 15/08* (2013.01); *B32B 5/024* (2013.01); *B32B 15/043* (2013.01); *B32B 15/14* (2013.01); *B32B 15/18* (2013.01); *B32B 15/20* (2013.01); *B32B 18/00* (2013.01); *B32B 27/12* (2013.01); *B32B 27/281* (2013.01); *B32B 2255/02* (2013.01); *B32B 2255/06* (2013.01); *B32B 2255/10* (2013.01); *B32B 2255/20* (2013.01); *B32B 2262/101* (2013.01); *B32B 2307/304* (2013.01); *B32B 2605/18* (2013.01)

(58) Field of Classification Search
None
See application file for complete search history.

(56) References Cited

U.S. PATENT DOCUMENTS

| | | | |
|---|---|---|---|
| 4,925,134 A | 5/1990 | Keller et al. | |
| 5,030,518 A | 7/1991 | Keller | |

(Continued)

FOREIGN PATENT DOCUMENTS

| | | |
|---|---|---|
| CN | 1056276 A | 11/1991 |
| CN | 1328501 A | 12/2001 |

(Continued)

*Primary Examiner* — Kim S. Horger
(74) *Attorney, Agent, or Firm* — McGarry Bair PC

(57) ABSTRACT

A thermal insulation system for an aerospace duct through which high temperature fluid, greater than 500 F, passes. The thermal insulation system can experience pressures less than 80 kilopascals and can be included in a turbine engine. The thermal insulation system includes at least a first foil layer confronting the duct, an insulation layer confronting the first foil layer, a second foil layer confronting the insulation layer, and at least one coating applied to any one of the layers.

19 Claims, 5 Drawing Sheets

(51) Int. Cl.
*B32B 27/12* (2006.01)
*B32B 27/28* (2006.01)

(56) References Cited

U.S. PATENT DOCUMENTS

| | | |
|---|---|---|
| 5,550,338 A | 8/1996 | Hielscher |
| 5,800,905 A | 9/1998 | Sheridan |
| 5,958,578 A | 9/1999 | Blohowiak et al. |
| 6,264,144 B1 | 7/2001 | Thornton |
| 6,485,805 B1 * | 11/2002 | Smith ................ F16L 59/029 |
| | | 428/36.5 |
| 6,586,111 B2 | 7/2003 | Ragland |
| 7,313,909 B2 | 1/2008 | Skoog et al. |
| 8,766,108 B2 | 7/2014 | Bunyan et al. |
| 9,585,249 B2 | 2/2017 | Cox et al. |
| 10,967,961 B2 | 4/2021 | Leiva et al. |
| 2017/0234228 A1 | 8/2017 | Ozcan |

FOREIGN PATENT DOCUMENTS

| | | |
|---|---|---|
| CN | 205078993 U | 3/2016 |
| EP | 1503133 B1 | 6/2014 |
| JP | 5744604 | 7/2015 |
| JP | 2015206276 A | 11/2015 |
| WO | 2008047027 A1 | 4/2008 |

\* cited by examiner

THERMAL INSULATION SYSTEM

CROSS-REFERENCE TO RELATED APPLICATION(S)

This application claims priority to Indian Patent Application No. 202111047592, filed Oct. 20, 2021, which is incorporated herein by reference its entirety.

TECHNICAL FIELD

The disclosure relates to a thermal insulation system for a conduit, tube, or duct, more specifically, a thermal insulation system for an aerospace component, conduit, tube, or duct.

BACKGROUND

A thermal insulation system or heat shield can circumscribe or otherwise be placed adjacent to one or more tubes or ducts carrying a hot fluid. The purpose of the thermal insulation system is to maintain the temperature in the tube or duct and provide an outer surface that has a cooler temperature than the tube or duct to which it is coupled. The thermal resistivity of the thermal insulation system depends on the thermal conductivity and thickness of the material or materials used to make the thermal insulation system.

BRIEF DESCRIPTION OF THE DRAWINGS

A full and enabling disclosure of the aspects of the present description, including the best mode thereof, directed to one of ordinary skill in the art, is set forth in the specification, which refers to the appended Figs., in which.

DETAILED DESCRIPTION

Figure 1:
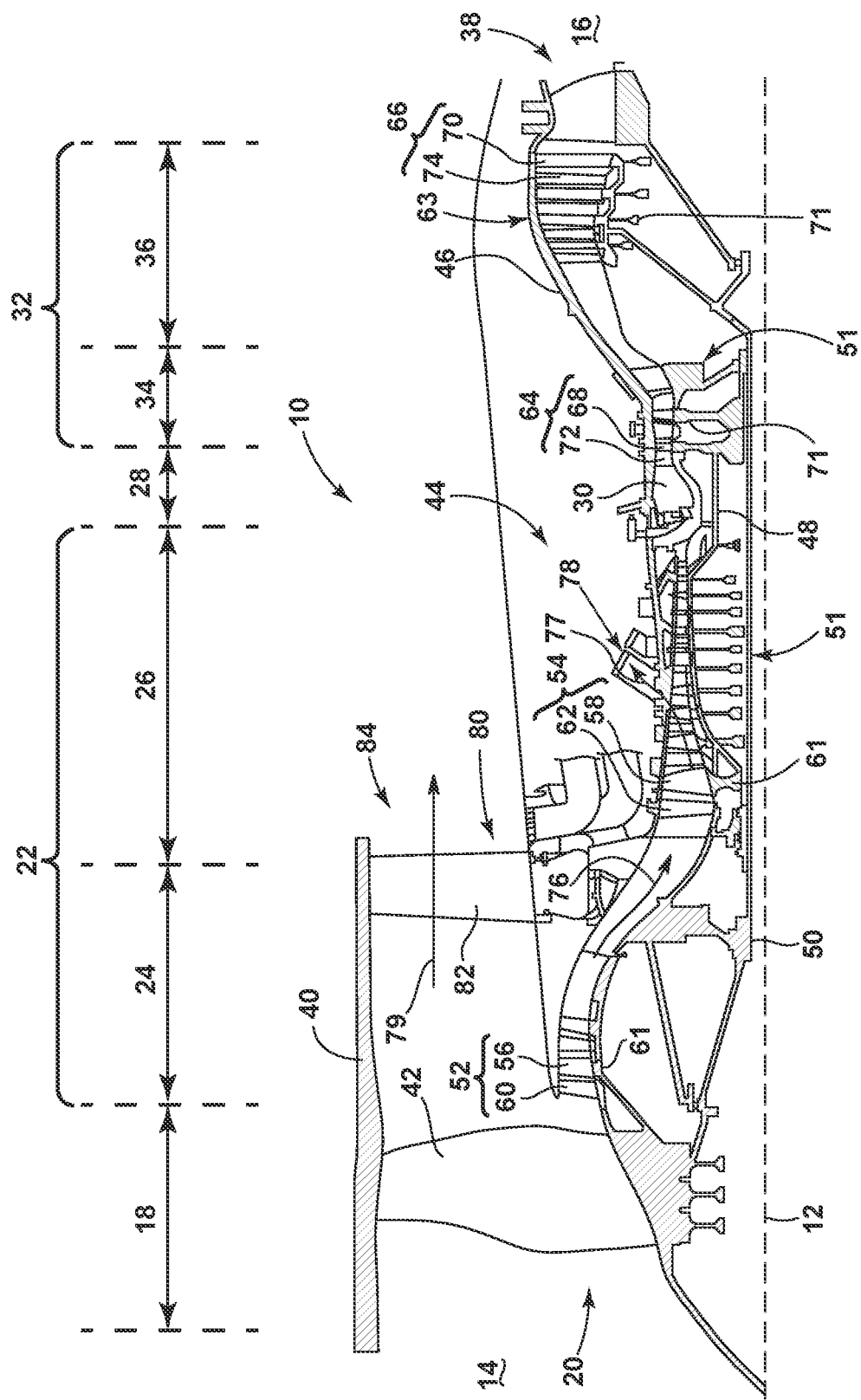
FIG. 1 is a schematic, sectional view of a turbine engine having at least one aerospace duct.

A thermal insulation system in the context of a turbine engine is required to perform in a variety of environments. Aircraft engines operate in an environment of varying ambient air pressures where ambient air pressures can be between 10-110 kilopascals (kPa) or 1.4-16 pounds per square inch (PSI). In less than standard atmospheric pressure or low pressure aerospace environments (ambient air pressures of 80 kPa or 11.6 PSI or less), heat transfer is dominated by radiation and conduction, rather than convection. The temperatures of the fluid or gas in some of the tubes and ducts of the turbine engine, while starting or once started, can equal 500 degrees Fahrenheit (260° Celsius or approximately 533 Kelvin) or more. At these temperatures, radiation, specifically infrared radiation (IR), becomes the primary mode of heat transfer as opposed to cooler temperatures in which conduction or convection can play a bigger role. Therefore, there is a need for improved thermal resistivity to the IR radiation. While a thicker, heavier thermal insulation system can possibly provide additional thermal resistivity, the thicker, heavier thermal insulation system would increase the mass and take up precious volume in an aerospace environment, where mass and volume are at a premium. Therefore, a more creative solution is needed in the aerospace industry, where smaller and lighter is a priority.

Aspects of the present disclosure are directed to a thermal insulation system for an aerospace component, conduit, tube, or duct. The layering and coating included in the disclosed thermal insulation system can increase thermal resistivity while decreasing or maintaining overall thickness of the thermal insulation system. Additionally, or alternatively, the thermal insulation system, as disclosed, can maintain thermal resistivity while decreasing the overall thickness or mass of the thermal insulation system.

It will be understood that the disclosure can have general use in a variety of applications, that is, the thermal insulation system can be utilized in any suitable mobile and/or non-mobile industrial, commercial, and/or residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the turbine engine and an outer turbine engine circumference. Furthermore, as used herein, the term "set" or a "set" of elements can be any number of elements, including only one.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor as defined above, and the controller module or processor can perform processing on the value to determine a representative value or an electrical characteristic representative of said value.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an example, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, a "thermal resistivity" is a heat property and a measurement of a temperature difference by which an object or material resists a heat flow. The thermal resistivity of an object can be expressed as shown in Equation 1 below:

$$R_t = \frac{L}{kA} \tag{1}$$

where $R_t$ represents thermal resistivity. L is the thickness of the material or the thickness of the plane of the material. k is the thermal conductivity of the material or materials and is the quantity of heat that passes in unit time through a unit area of plate whose thickness is unity when its opposite faces differ in temperature by one degree. A is the area of the plane or the cross-sectional area perpendicular to the path of heat flow. Therefore, the thermal resistivity of a thermal insulation system depends on the thermal conductivity, thickness, and area of the material or materials used to make the thermal insulation system.

FIG. 1 is a schematic cross-sectional diagram of a turbine engine 10 for an aircraft. The turbine engine 10 has a centerline or longitudinal axis 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the longitudinal axis 12. The HP compressor 26, the combustor 30, and the HP turbine 34 form an engine core 44, which generates combustion gases. The engine core 44 is surrounded by core casing 46, which can be coupled with the fan casing 40.

A HP shaft or spool 48 disposed coaxially about the longitudinal axis 12 of the turbine engine 10 drivingly connects the HP turbine 34 to the HP compressor 26. A LP shaft or spool 50, which is disposed coaxially about the longitudinal axis 12 of the turbine engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define an inner rotor/stator 51. While illustrated as a rotor, it is contemplated that the inner rotor/stator 51 can be a stator.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the longitudinal axis 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the longitudinal axis 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine section 22, 32 are also referred to individually or collectively as an outer rotor/stator 63. As illustrated, the outer rotor/stator 63 can refer to the combination of non-rotating elements throughout the turbine engine 10. Alternatively, the outer rotor/stator 63 that circumscribes at least a portion of the inner rotor/stator 51, can be designed to rotate. The inner or outer rotor/stator 51, 63 can include at least one component that can be, by way of non-limiting example, a shroud, vane, nozzle, nozzle body, combustor, hanger, or blade, where the at least one component is a plurality of circumferentially arranged component segments having confronting pairs of circumferential ends.

In operation, the turbine engine 10 can move through a cycle of operation. The cycle of operation can include, but is not limited to, start-up, idle, take-off, cruse, decent or land, and shut-down. During start-up the turbine engine 10 is provided with mechanical energy to begin the rotation of the HP shaft or spool 48 or the LP shaft or spool 50. Once started, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling via at least one aerospace conduit, tube, or duct 78. The temperature of pressurized airflow 76 entering the combustor 30 is significantly increased. As such, cooling provided by the bleed air 77 is necessary for operating of such engine components in the heightened temperature environments.

A remaining portion of the airflow 79 bypasses the LP compressor 24 and the engine core 44 and exits the turbine engine 10 assembly through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 79.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

The turbine engine 10 can then move through the different portions of the cycle of operation by increasing, decreasing, or maintaining fuel provided to the combustor 30. Additionally, or alternative, the turbine engine 10 can then move through the different portions of the cycle of operation by increasing, decreasing, or maintaining the rotational speed of one or more components.

Figure 2:
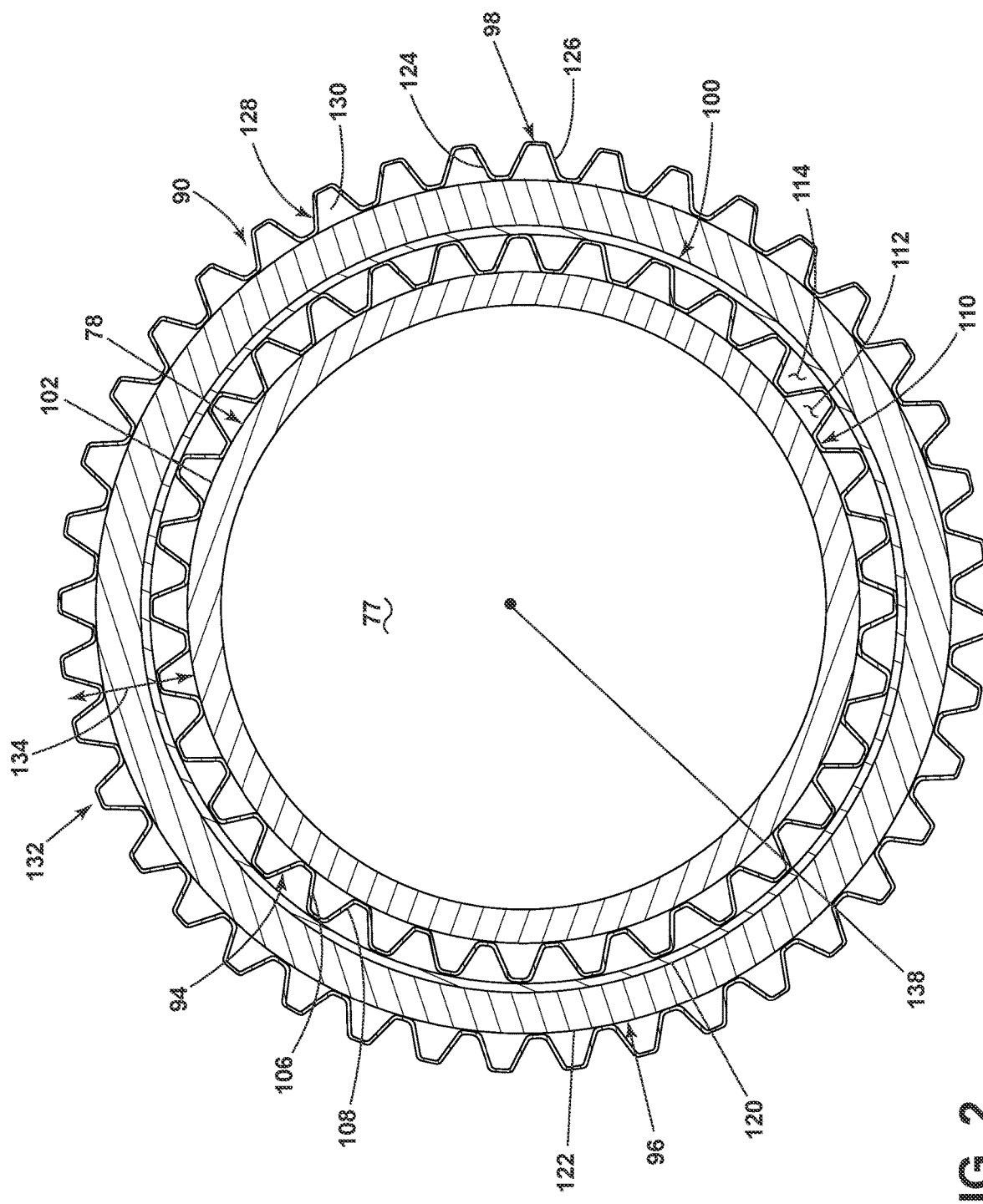
FIG. 2 is a schematic cross section of the duct of FIG. 1 illustrating a thermal insulation system covering or encasing the duct.

FIG. 2 is a schematic illustration of an aerospace component, conduit, tube, or duct that includes a multi-layer, thermal wrap, heat shield, thermal insulation stack, or thermal insulation system illustrated as a first thermal insulation system 90. By way of non-limiting example, the first thermal insulation system 90 is illustrated as circumscribing, covering, or encasing the aerospace duct 78 that directs the bleed air 77. It is contemplated that the first thermal insulation system 90 can be located adjacent to or arc around one or more portions of the duct 78. That is, the first thermal insulation system 90 does not have to completely circumscribe the duct 78. Additionally, or alternatively, the first thermal insulation system 90 can circumscribe, be located adjacent, or located within the nacelle or fan casing 40. It is also contemplated that the first thermal insulation system 90 can circumscribe or be adjacent to an exterior of the engine core 44. It is further contemplated that the first thermal insulation system 90 can circumscribe or be located adjacent to one or more tubes or ducts within the engine core 44.

Fluid passing through the aerospace duct 78 can be 500 degrees Fahrenheit (260° Celsius or approximately 533 Kelvin) or more. That is, fluid or bleed air 77 flowing through the duct 78 can be at or above 500 degrees Fahrenheit (260° Celsius or approximately 533 Kelvin). The temperature of the fluid in the duct 78 can depend on the cycle of operation of the turbine engine 10, where different portions or steps of the cycle of operation can indicate or provide a range of possible temperatures of the fluid in the duct 78. For example, while the engine 10 is not operating, the temperature of the fluid in the duct 78 can be as low as −50 degrees Fahrenheit (approximately −46° Celsius; approximately 228 Kelvin). While in a cycle of operation, the duct 78 of engine 10 can experience fluids as hot as 2000 degrees Fahrenheit (approximately 1093° Celsius; approximately 1366 Kelvin). At temperatures at or above 500 degrees Fahrenheit (260° Celsius or approximately 533 Kelvin) heat transfer predominately occurs via infrared radiation.

The first thermal insulation system 90 can include a first foil layer 94, an insulation layer 96, a second foil layer 98, and at least one infrared coating 100 applied to any one of the first foil layer 94, the insulation layer 96, or the second foil layer 98. The insulation layer 96 includes materials that can slow heat transfer via conduction, slow heat transfer via convection, reflect a portion of incident infrared radiation or any combination therein. The at least one infrared coating 100 reflects at least a portion of incident infrared radiation.

The first foil layer 94 confronts an exterior wall 102 of the duct 78 The first foil layer 94 can have a first foil inner face 106 that is obverse to a first foil outer face 108. As illustrated, by way of example, the first foil layer 94 confronts the duct 78. That is, the first foil inner face 106 is in contact to or directly adjacent the exterior wall 102 of the duct 78. While illustrated as circumscribing and in at least partial contact with the duct 78, it is contemplated that one or more of an air gap, coating, or partial coating can be located between the exterior wall 102 of the duct 78 and the first foil layer 94 of the first thermal insulation system 90.

The first foil layer 94 can include, by way of non-limiting example, one or more of chromium, carbon, nitrogen, aluminum, silicon, sulfur, titanium, nickel, copper, selenium, niobium, molybdenum, iron, or stainless steel.

At least one dimple 110 can be provided in the first foil layer 94 that can define at least one inner gas pocket 112 between the first foil inner face 106 and the exterior wall 102 of the duct 78. That is, the at least one inner gas pocket 112 can be defined as non-contacting portions of the first foil layer 94 and the duct 78. The at least one inner gas pocket 112 can be filled with air or other fluids.

An at least one outer gas pocket 114 can be defined by the first foil outer face 108 and an inner insulation face 120 or the at least one infrared coating 100. That is, the at least one outer gas pocket 114 can be defined as non-contacting portions of the first foil layer 94 and the insulation layer 96 or the at least one infrared coating 100. The at least one outer gas pocket 114 can be filled with air or other fluids.

While illustrated as generally sinusoidal, the at least one dimple 110 can have any cross-sectional shape and can protrude or recess in more than one dimension. It is further contemplated that the at least one inner gas pocket 112 or the at least one outer gas pocket 114 can be formed within the first foil layer 94.

The insulation layer 96 includes the inner insulation face 120 and an outer insulation face 122 obverse to the inner insulation face 120, where the inner insulation face 120 can confront the first foil layer 94. That is, the insulation layer 96 can be radially exterior of the first foil layer 94. This orientation results in the first foil layer 94 being positioned between the duct 78 and the insulation layer 96.

The insulation layer 96 can be quilted, woven, or any contemplated combination of fibers or materials. By way of non-limiting example, the insulation layer 96 can include one or more of ceramic materials or fibers, silicate, fiberglass, oxygen, aluminum, silicon, titanium, zirconium, yttrium, iron, chromium, carbon, nitrogen, sulfur, nickel, copper, selenium, niobium, molybdenum, or stainless steel.

The second foil layer 98 can have a second foil inner face 124 that is obverse to a second foil outer face 126. As illustrated, by way of example, the second foil layer 98 confronts the insulation layer 96. That is, the second foil inner face 124 is in contact to or directly adjacent the outer insulation face 122. While illustrated as circumscribing and in at least partial contact with the insulation layer 96, it is contemplated that one or more of an air gap, additional layer, or coating can be located between the outer insulation face 122 and the second foil inner face 124.

The second foil layer 98 can include, by way of non-limiting example, one or more of chromium, carbon, nitrogen, aluminum, silicon, sulfur, titanium, nickel, copper, selenium, niobium, molybdenum, iron, or stainless steel.

At least one dimple 128 in the second foil layer 98 can define at least one gas pocket 130 between the second foil inner face 124 and the outer insulation face 122. That is, the at least one gas pocket 130 can be defined as non-contacting portions of the second foil layer 98 and the insulation layer 96. The at least one gas pocket 130 can be filled with air or other fluids.

While illustrated as generally sinusoidal, the at least one dimple 128 can have any cross-sectional shape and protrude or recess in more than one dimension.

It is contemplated that the dimensions, number, or frequency of dimples can vary between the first foil layer 94 and the second foil layer 98. It is further contemplated that the materials and overall dimension of the first foil layer 94 can be different from the second foil layer 98.

By way of non-limiting example, the at least one infrared coating 100 is applied to the inner insulation face 120 of the insulation layer 96. However, it is contemplated that the at least one infrared coating 100 can be applied to one or more of the first foil inner face 106, the first foil outer face 108, the inner insulation face 120, the outer insulation face 122, the second foil inner face 124, or the second foil outer face 126. That is, the at least one infrared coating 100 can be applied to one or more portions of the first foil layer 94, the insulation layer 96, or the second foil layer 98.

The at least one infrared coating 100 can be extremely reflective and therefore have a low emissivity. That is the at least one infrared coating 100 can have an emissivity at or between 0.0 and 0.4. at a temperature range of 2000 degrees Fahrenheit (approximately 1093o Celsius; approximately 1366 Kelvin) or less. As used herein, the term "emissivity" is the ratio of heat energy radiated per unit time per unit area by an object to the amount of heat energy radiated per unit time per unit area by a perfect black body of the same temperature.

The at least one infrared coating 100 can reflect a predetermined range of infrared radiation. That is, by way of example, the at least one infrared coating 100 can reflect a wavelength range of approximately 0.7 to 1000 micrometers. The at least one infrared coating 100 can include one or more of silica, alumina, titania (titanium dioxide), silicon, aluminum, titanium, tantalum, zirconium, yttrium, niobium, tungsten, molybdenum, iron, oxygen, germanium, zinc, sulfide, sulfur, selenide, calcium, fluorine, boron, gallium, arsenide, cadmium, telluride, cesium, bromide, iodide, chalcogenide glass, lithium, magnesium, fluoride, nickel, or copper.

Optionally, a primer layer can be added to the first foil layer 94, the insulation layer 96, or the second foil layer 98 prior to or during the application of the at least one infrared coating 100.

It is contemplated that thermal conductivity of the at least one infrared coating 100 can be within 40% of the insulation layer 96. However, the at least one infrared coating 100 can be more reflective than the insulation layer 96, the at least one infrared coating 100 having emissivity at or between 0.0-0.4.

A composite 132, having multiple layers, can be defined by the first foil layer 94, the insulation layer 96, the second foil layer 98, and the at least one infrared coating 100. An overall thickness 134 can be measured from the exterior wall 102 of the duct 78 to the second foil outer face 126 at a peak or farthest point from the duct 78. Alternatively, the overall thickness 134 can be measured from the first foil inner face 106 at a trough or closest point to the duct 78 to the second foil outer face 126 at a peak or farthest point from the duct 78. The measurement of the overall thickness 134 can be measured along an extended radius line from a center 138 of the duct 78.

The overall thickness 134 can be between 0.1 inches and 0.6 inches (approximately 2.5 millimeters to 15.2 millimeters). A maximum touch temperature or surface temperature at the outside surface or the second foil outer face 126 can be 550 degrees Fahrenheit (approximately 288° Celsius or 561 Kelvin) or less at any point of the cycle of operation of the turbine engine 10. The turbine engine 10, and therefore the composite 132, can experience atmospheric pressures anywhere between 10 kilopascal (kPa) and 110 kPa during a cycle of operation. It is further contemplated that at least a portion of the cycle of operation takes place in atmospheric pressure that at or below 80 kPa, such that the turbine engine 10, the duct 78, and the first thermal insulation system 90 experience atmospheric pressure at or below 80 kPa.

Figure 3:
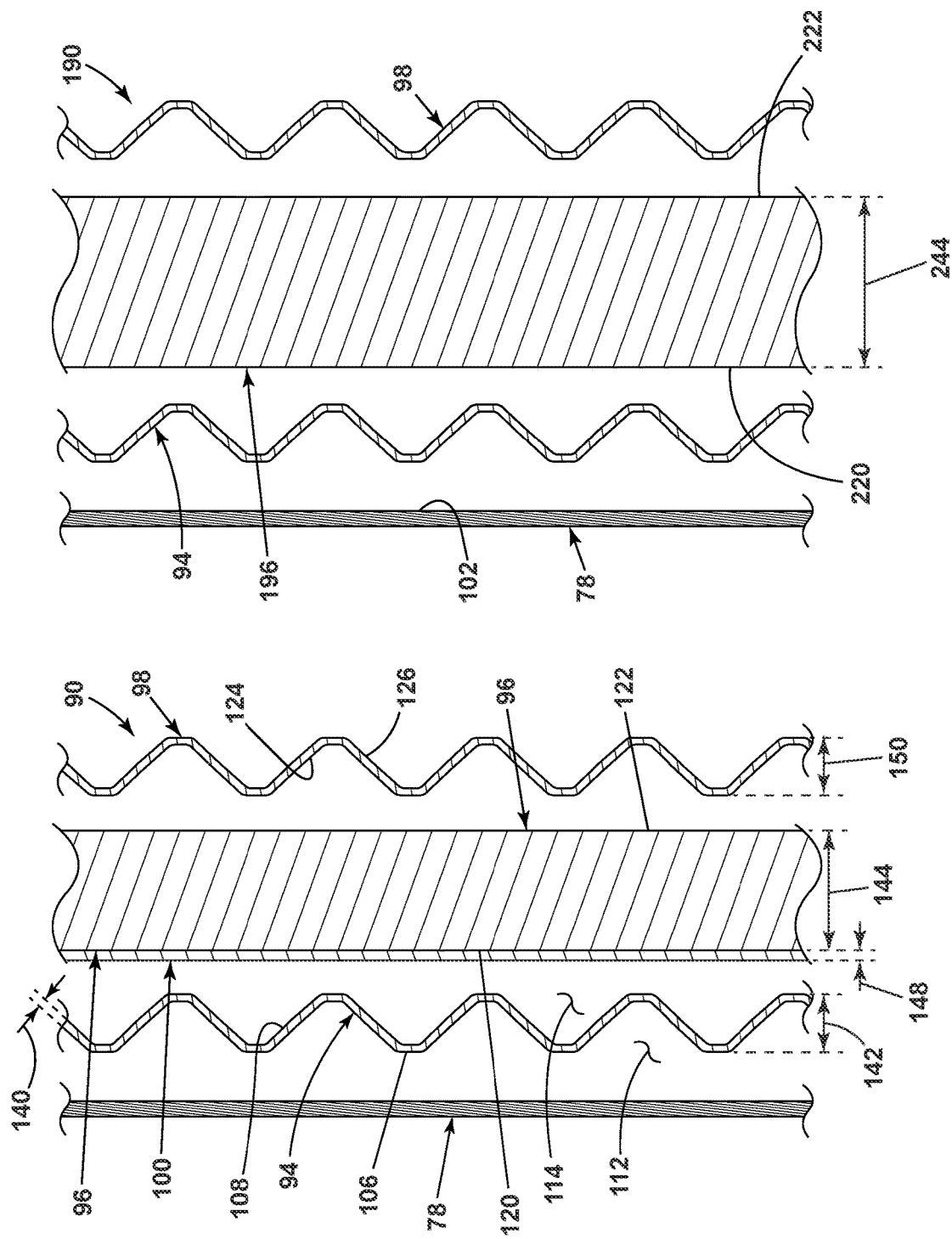
FIG. 3A is an exploded schematic illustration of a portion of the thermal insulation system and the duct of FIG. 2.
FIG. 3B is an exploded view of a variation of the thermal insulation system and the duct of FIG. 3A.

FIG. 3A illustrates an exploded schematic of a portion of the first thermal insulation system 90. While illustrated as having air gaps between the duct 78, the first foil layer 94, the insulation layer 96, and the second foil layer 98, one or more, or portions of one or more of the duct 78, the first foil layer 94, the insulation layer 96, and the second foil layer 98 can be in contact with each other.

The material thickness 140 of the first foil layer 94 is measured from the first foil inner face 106 to the first foil outer face 108. While any value is contemplated, the material thickness 140 can be between 0.001 inches and 0.02 inches (approximately 25 micrometers-508 micrometers).

The at least one dimple 110 can have a dimple height 142 between 0.001 inches and 0.05 inches (approximately 25 micrometers-1270 micrometers), however, any dimple height 142 is contemplated.

While any value is contemplated, the thermal conductivity of the first foil layer 94 can be between 5 British thermal units per foot hour degrees Fahrenheit (BTU/(ft*h*° F.)) and 140 BTU/(ft*h*° F.) (approximately 8 Watts per meter Kelvin (W/mK) and 242 W/mK). It is further contemplated that the thermal resistivity of the first foil layer 94 and the at least one inner gas pocket 112 or the at least one outer gas pocket 114 can be greater than the thermal resistivity of the first foil layer 94. That is, the combined thermal conductivity of the first foil layer 94 and the at least one inner gas pocket 112 or the at least one outer gas pocket 114 can be less than the thermal conductivity of the first foil layer 94. While any value is contemplated, the emissivity of the first foil layer 94 can be between 0.1 and 0.4. The emissivity of 0.1-0.4 for the first foil layer 94 corresponds to the first foil layer 94 in a pristine state.

An insulation thickness 144 of the insulation layer 96 can be measured from the inner insulation face 120 to the outer insulation face 122. The insulation thickness 144 can be between 0.05 inch and 0.5 inches (approximately 1.2 millimeters to 12.7 millimeters). However, any insulation thickness 144 is contemplated.

The at least one infrared coating 100 can have a coating thickness 148 at or between 0.0001 inches to 0.010 inches (approximately 2.5 micrometers to 254 micrometers).

The material thickness of the second foil layer 98 can be measured from the second foil inner face 124 to the second foil outer face 126. While any value is contemplated, the material thickness of the second foil layer 98 can be between 0.001 inches and 0.020 inches (approximately 25 micrometers-508 micrometers).

A second foil dimple height 150 can be between 0.001 inches and 0.05 inches (approximately 25 micrometers-1270 micrometers), however, any second foil dimple height 150 is contemplated. That is, the second foil dimple height 150 can be greater than, equal to, or less than, the dimple height 142 of the first foil layer 94.

While any value is contemplated, the thermal conductivity of the second foil layer 98 can be between 5 British thermal units per foot hour degrees Fahrenheit (BTU/(ft*h*° F.)) and 140 BTU/(ft*h*° F.) (approximately 8 Watts per meter Kelvin (W/mK) and 242 W/mK). While any value is contemplated, the emissivity of the second foil layer 98 can be between 0.1 and 0.4.

FIG. 3B illustrates an exploded schematic of a portion of a second thermal insulation system 190 that could be used to shield the duct 78. The second thermal insulation system 190 is similar to the first thermal insulation system 90, therefore, like parts will be identified with like numerals increased by 100, with it being understood that the description of the like parts of the first thermal insulation system 90 applies to the second thermal insulation system 190, unless otherwise noted. The thermal resistivity of the second thermal insulation system 190 is equal to or less than the thermal resistivity of the first thermal insulation system 90. The first thermal insulation system 90 includes the at least one infrared coating 100, whereas the second thermal insulation system 190 does not include at least one infrared coating.

The second thermal insulation system 190 includes the first foil layer 94, an insulating layer 196, and a second foil layer 98. The first foil layer 94 confronts the exterior wall 102 of the duct 78. The insulation layer 196 includes the inner insulation face 220 and an outer insulation face 222 obverse to the inner insulation face 220, where the inner insulation face 220 can confront the first foil layer 94. That is, the insulation layer 196 can be radially exterior of the first foil layer 94. This orientation results the first foil layer 94 between the duct 78 and the insulation layer 196.

An insulation thickness 244 of the insulation layer 196 can be measured from the inner insulation face 220 to the outer insulation face 222. The insulation thickness 244 can be between 0.051 inch and 0.85 inches (approximately 1.3 millimeters to 21.6 millimeters). However, any insulation thickness 244 is contemplated.

By way of nonlimiting example, the insulation thickness 244 of the second thermal insulation system 190 is 5%-70% larger than the insulation thickness 144 of the first thermal insulation system 90. By way of further non-limiting example, the insulation thickness 244 of the second thermal insulation system 190 can be 10%-40% larger than the insulation thickness 144 of the first thermal insulation system 90.

In other words, the inclusion of the at least one infrared coating 100 in the first thermal insulation system 90 can reduce the insulation thickness of the insulation layer 96 by 5%-70% while maintaining or increasing the thermal resistance. It is further contemplated that the inclusion of the at least one infrared coating 100 can reduce the insulation thickness of the insulation layer 96 by 5%-70% while increasing the thermal resistance between 1%-60%. That is, the thermal resistance of the first thermal insulation system 90 can be 1%-60% greater than the thermal resistance of the second thermal insulation system 190. By way of non-limiting example, the thermal resistance of the first thermal insulation system 90 can be 5%-40% greater than the thermal resistance of the second thermal insulation system 190.

Additionally, the at least one infrared coating 100 does not have to be applied or coupled to the insulation layer 96 to have the benefit of a decreased insulation thickness 144 as compared to the insulation layer 196 of the second thermal insulation system 190. The difference between the insulation thickness 144 of the first thermal insulation system 90 and the insulation thickness 244 of the second thermal insulation system 190 can be a result of applying or coupling the at least one infrared coating 100 to one or more surfaces of the first foil layer 94 or the second foil layer 98 of the first thermal insulation system 90.

It is further contemplated that the insulation thickness 144 of the first thermal insulation system 90 can further decrease when the at least one infrared coating 100 is multiple thermal infrared coatings (two or more coatings). By way of non-limiting example, the insulation thickness 144 can be decreased by 5%-70% when the at least one infrared coating 100 is applied to the first foil inner face 106, the first foil outer face 108, and the inner insulation face 120.

In operation, the turbine engine 10 can go through the cycle of operation, which changes the temperature and velocity of the fluid flowing through the duct 78. Temperature in the duct 78 during portions of the cycle of operation can be 500 degrees Fahrenheit (260° Celsius or approximately 533 Kelvin) or more. The temperature at or above 500 degrees Fahrenheit (260° Celsius or approximately 533 Kelvin) can occur when the first thermal insulation system 90 is experiencing an atmospheric pressure that is 80 kPa or less. That is, the duct 78 and turbine engine 10 are in an aircraft that can ascend, cruse, and descend; wherein the duct 78 would experience a variety of atmospheric pressures.

The term "high temperature fluid" as used herein relates to fluid that is 500 degrees Fahrenheit (260° Celsius or approximately 533 Kelvin) or more. High temperature fluid passes through the duct 78. The first thermal insulation system 90 can provide thermal resistance at the duct 78 which reduces the temperatures experienced by surrounding components.

The first thermal insulation system 90 can reflect a majority of the heat and disperse the heat that isn't reflected. The first foil layer 94 can be dimpled stainless steel. The dimples allow for still air conduction, while the reflective material (such as stainless steel or infrared coated stainless steel) can reflect heat; including heat transmitted by infrared radiation. The stainless steel can be coated with the at least one infrared coating 100 to increase reflectance (or decrease emissivity) of the first foil layer 94. Further, it is contemplated that adding the at least one infrared coating 100 to the first foil layer 94 can preserve the emissivity of the first foil layer 94. That is, the at least one infrared coating 100, when applied to the first foil layer 94 allows the emissivity of the first foil layer 94 to remain between 0.1 and 0.4 during one or more cycles of operation.

Infrared radiation that isn't reflected or dissipated by the first foil layer 94 then passes to the insulation layer 96. The insulation layer 96 can include the at least one infrared coating 100 to reflect infrared radiation prior to the insulation layer 96. The insulation layer 96 can be a woven material that helps to trap the heat and reduce the infrared radiation provided at the second foil outer face 126 of the insulation layer 96. This can result in heat dissipation throughout the insulation layer 96.

Infrared radiation that isn't reflected by the first foil layer 94 otherwise blocked or trapped by the insulation layer 96 can be reflected or dissipated by the second foil layer 98. The second foil layer 98 can be dimpled stainless steel. One or more sides of the second foil layer 98 can be coated with the at least one infrared coating 100 to increase reflectance (or decrease emissivity). Dimples in the second foil layer 98 can provide still air conduction, while the reflective material or coating of the second foil layer 98 can reflect the infrared radiation.

It is contemplated that during the cycle of operation, the outside surface temperature or the touch temperature of the first thermal insulation system 90 does not exceed 550 degrees Fahrenheit (approximately 288° Celsius or 561 Kelvin). It is further contemplated that the outside surface temperature does not exceed 450 degrees Fahrenheit (approximately 232° Celsius or 505 Kelvin).

Figure 4:
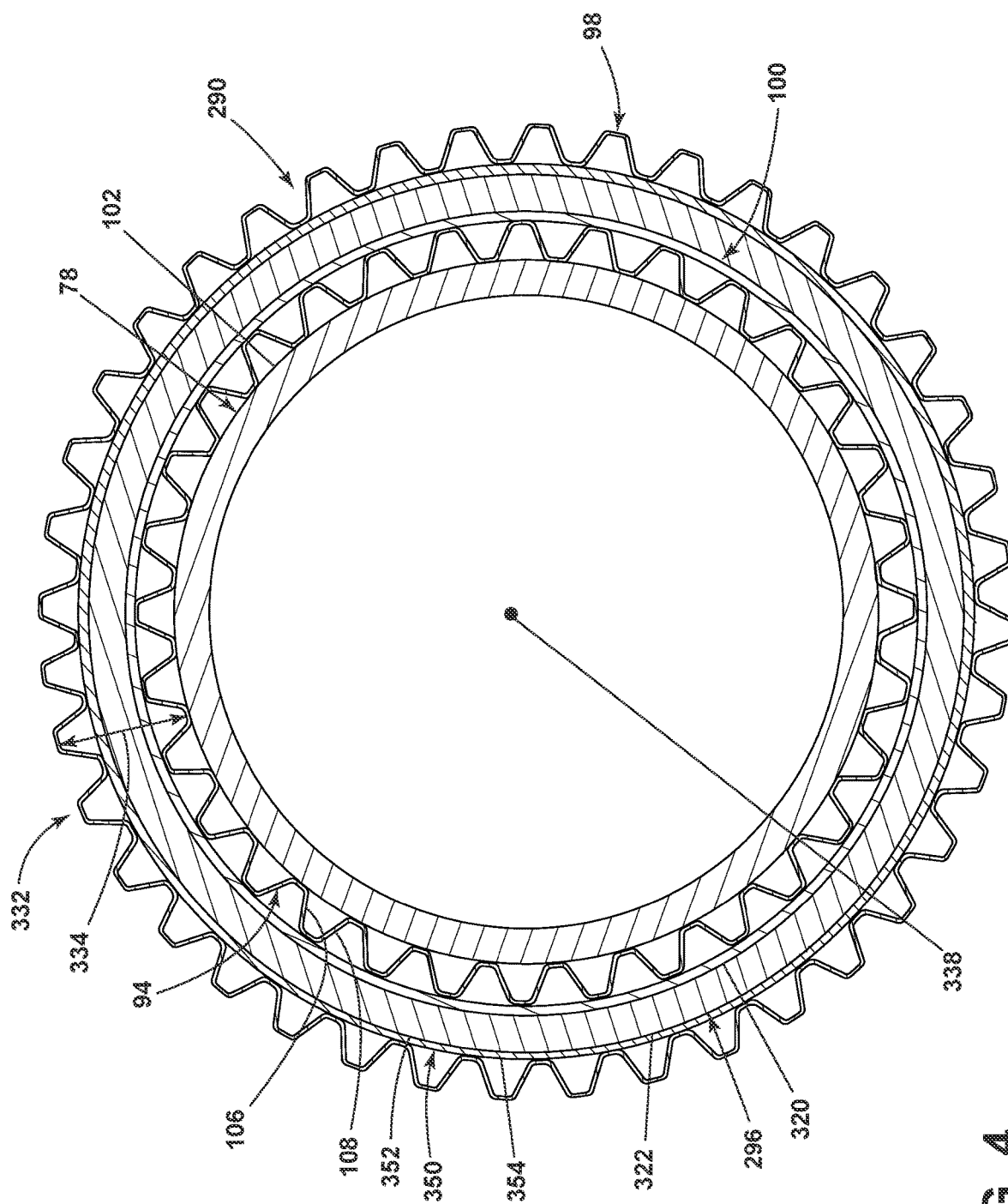
FIG. 4 is a variation of the schematic cross section of the thermal insulation system and the duct of FIG. 2.

FIG. 4 a schematic illustration of an aerospace casing, conduit, tube, or duct 78 that includes a multi-layer thermal insulation system, thermal insulation stack, thermal wrap or heat shield illustrated as a third thermal insulation system 290. The third thermal insulation system 290 is similar to the first thermal insulation system 90, therefore, like parts will be identified with like numerals further increased by 100, with it being understood that the description of the like parts of the first thermal insulation system 90 applies to the third thermal insulation system 290, unless otherwise noted.

The third thermal insulation system 290 is a multi-layer wrap that can include a first foil layer 94, an insulation layer 296, at least one film layer 350, a second foil layer 98, and at least one infrared coating 100 applied to any one of the first foil layer 94, the insulation layer 96, the at least one film layer 350, or the second foil layer 98.

The thermal resistivity of the third thermal insulation system 290 is equal to or less than the thermal resistivity of the first thermal insulation system 90. The first thermal insulation system 90 includes the at least one infrared coating 100, whereas the third thermal insulation system 290 includes the at least one infrared coating 100 and the at least one film layer 350.

The first foil layer 94 confronts the exterior wall 102 of the duct 78. Optionally, the first foil inner face 106 or the first foil outer face 108 can include at least one infrared. The insulation layer 296 can be radially exterior of the first foil layer 94. That is, an inner insulation face 320 can confront the first foil layer 94. The inner insulation face 320, as illustrated by way of example, can include the at least one infrared coating 100. Additionally, or alternatively, an outer insulation face 322 can include the at least one infrared coating (not shown).

The at least one film layer 350 can have an inner film face 352 and an outer film face 354 that is obverse to the inner film face 352. Optionally, one or both of the inner film face 352 or the outer film face 354 can include the at least one infrared coating (not shown). The inner film face 352 confronts the insulation layer 296, wherein the outer film face 354 confronts the second foil layer 98.

It is contemplated that the at least one film layer 350 can be multiple layers of film located between the insulation layer 296 and the second foil layer 98. It is further contemplated that any number, including zero, of the faces of the multiple layers of film can include the at least one infrared coating 100.

The at least one film layer 350 can include one or more polyimide sheets. Additionally, or alternatively, the at least one film layer 350 can include any polymerized combination of material or silicone.

Optionally, the at least one film layer 350 can be located between the first foil layer 94 and the insulation layer 296. It is contemplated that the at least one film layer 350 can be multiple layers of film that can be located between one or both of the first foil layer 94 and the insulation layer 296 or the insulation layer 296 and the second foil layer 98.

A composite 332, having multiple layers, can be defined by the first foil layer 94, the insulation layer 96, the at least one film layer 350, the second foil layer 98, and the at least one infrared coating 100. The overall thickness 334 can be measured from the exterior wall 102 of the duct 78 to the duct 78 to the second foil outer face 126 at a peak or farthest point from the duct 78. Alternatively, the overall thickness 334 can be measured from the first foil inner face 106 at a trough or closest point to the duct 78 to the second foil outer face 126 at a peak or farthest point from the duct 78. The measurement of the overall thickness 334 can be measured along an extended radius line from a center 338 of the duct 78.

The overall thickness 334 can be between 0.1 inches and 0.6 inches (approximately 2.5 millimeters to 15.2 millimeters). The outside surface temperature or the touch temperature of the third thermal insulation system 290 does not exceed 550 degrees Fahrenheit (approximately 288° Celsius or 561 Kelvin). It is further contemplated that the outside surface temperature does not exceed 450 degrees Fahrenheit (approximately 232° Celsius or 505 Kelvin).

Figure 5:
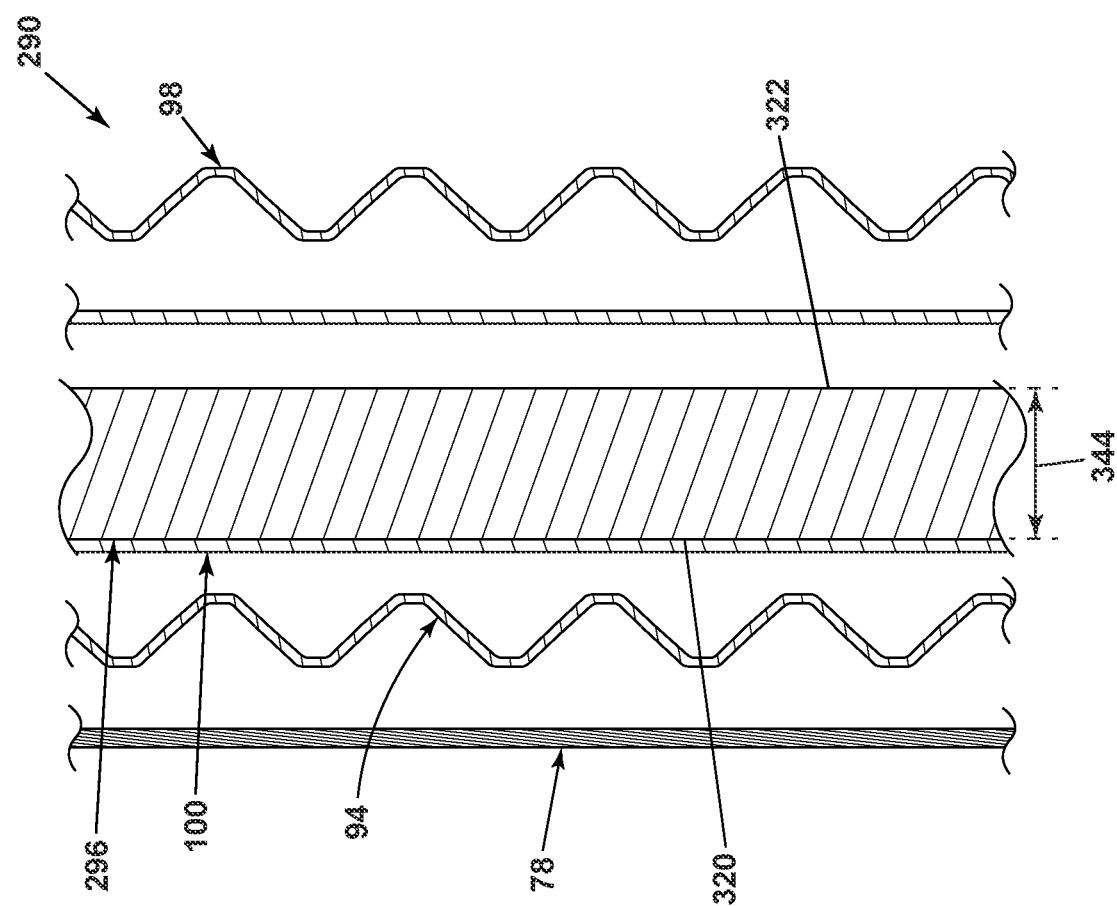
FIG. 5. is an exploded schematic illustration of a portion of the thermal insulation system and duct of FIG. 4.

FIG. 5 illustrates an exploded schematic of a portion of the third thermal insulation system 290. While illustrated as having air gaps between the duct 78, the first foil layer 94, the insulation layer 296, the at least one film layer 350, and the second foil layer 98, one or more, or portions of one or more of the duct 78, the first foil layer 94, the insulation layer 96, and the second foil layer 98 can be in contact with each other. By way of non-limiting example, the at least one infrared coating 100 is illustrated as applied to the insulation layer 296.

An insulation thickness 344 of the insulation layer 296 can be measured from the inner insulation face 320 to the outer insulation face 322. The insulation thickness 344 can be between 0.05 inch and 0.5 inches (approximately 1.2 millimeters to 12.7 millimeters). However, any insulation thickness 344 is contemplated. While illustrated as having similar dimensions to the insulation layer 96 of the first thermal insulation system 90, it is contemplated that the insulation thickness 344 of the third thermal insulation system 290 can be less than the insulation thickness 144 of the first thermal insulation system 90. Alternatively, the insulation thickness 344 of the third thermal insulation system 290 can be equal to or greater than the insulation thickness 144 of the first thermal insulation system 90.

It is contemplated that, while maintaining thermal resistivity, the at least one film layer 350 can reduce the insulation thickness 344 of the third thermal insulation system 290 by 1%-50% when compared to the insulation thickness 144 of the first thermal insulation system 90. It is further contemplated that the insulation thickness 344 of the third thermal insulation system 290 can be 1%-50% less than the insulation thickness 144 of the first thermal insulation system 90 while the thermal resistivity of the third thermal insulation system 290 is greater than the first thermal insulation system 90 by 1%-30%.

Aspects of the present disclosure provide for a variety of benefits including incorporating thin low-mass infrared radiation coatings in high-temperature radiation dominated aerospace environments. The incorporation of the infrared coating in the heat shield or thermal insulation system lowers the overall mass and thickness of the thermal insulation system.

That is, with the addition of the infrared coating, the thickness or mass of the insulation layer can be reduced. For example, the inclusion of the infrared coating or coatings can reduce the insulation thickness of the insulation layer by 5%-70% or 10%-40% while maintaining the thermal resistance of the thermal insulation system.

Further the inclusion of the infrared coating on one or more components of the thermal insulation system can reduce the thickness of the insulation layer by 5%-70% while increasing the thermal resistance of the thermal insulation system by or between 1%-60%.

Another advantage of including the film layer is that it can further reduce the thickness of the insulation layer or increase the thermal resistance of the composite.

The film layer or film layers can be used at the cooler end (or between the insulation layer and the second foil layer) to effectively replace a portion of the thermal layer or the thermal blanket while retaining adequate thermal resistivity or improving thermal resistivity.

Another advantage is that the at least one IR coating can preserve the emissivity of one or more foil layers. Exposure to high temperatures can cause oxidation or other markings that can reduce the emissivity of the foil layer. The addition of the at least one infrared coating to the first foil layer or the second foil layer can preserve the emissivity of the foil layer.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A thermal insulation system for an aerospace duct through which high temperature fluid, greater than 500 F, passes, the thermal insulation system comprising a first foil layer confronting the aerospace duct, an insulation layer confronting the first foil layer, a second foil layer confronting the insulation layer, and at least one infrared coating applied to any one of the first foil layer, the insulation layer, or the second foil layer, wherein the first foil layer, the insulation layer, the second foil layer, and the at least one infrared coating define a composite having a thickness less than or equal to 0.6 inches (approximately 15.2 millimeters).

The thermal insulation system of the preceding clause wherein the insulation layer comprises one or more of ceramic materials or fibers, silicate, fiberglass, oxygen, aluminum, silicon, titanium, zirconium, yttrium, iron, chromium, carbon, nitrogen, sulfur, nickel, copper, selenium, niobium, molybdenum, or stainless steel.

The thermal insulation system of any of the preceding clauses wherein the at least one infrared coating comprises one or more of silica, alumina, titania, silicon, aluminum, titanium, tantalum, zirconium, yttrium, niobium, tungsten, molybdenum, iron, oxygen, germanium, zinc, sulfide, sulfur, selenide, calcium, fluorine, boron, gallium, arsenide, cadmium, telluride, cesium, bromide, iodide, chalcogenide glass, lithium, magnesium, fluoride, nickel, or copper.

The thermal insulation system of any of the preceding clauses wherein the thermal insulation system experiences ambient air pressure less than standard atmospheric pressure.

The thermal insulation system of any of the preceding clauses wherein thermal conductivity of the at least one coating is within 40% of the insulation layer.

The thermal insulation system of any of the preceding clauses wherein the addition of the at least one infrared coating to the thermal insulation system reduces an insulation thickness of the insulation layer by 10%-40% while maintaining thermal resistance of the thermal insulation system.

The thermal insulation system of any of the preceding clauses wherein the inclusion of the at least one infrared coating reduces an insulation thickness of the insulation layer by 10%-40% while increasing thermal resistance of the thermal insulation system by 5%-40%.

The thermal insulation system of any of the preceding clauses wherein the at least one infrared coating is multiple thermal infrared coatings located on two or more faces of the first foil layer, the second foil layer, or the insulation layer.

The thermal insulation system of any of the preceding clauses, further comprising at least one film layer between the second foil layer and the insulation layer or between the insulation layer and the first foil layer.

The thermal insulation system of any of the preceding clauses wherein the at least one film layer comprises at least one polyimide sheet.

The thermal insulation system of any of the preceding clauses wherein the at least one film layer comprises an infrared coating on one or more faces of the at least one film layer.

A thermal insulation system for an aerospace duct through which high temperature fluid, greater than 500 F, passes, with the thermal insulation system comprising a composite having multiple layers with a least one infrared coating applied to at least one of the multiple layers resulting in an overall thickness between 0.1 inches and 0.6 inches (approximately 2.5 millimeters to 15.2 millimeters), with a maximum surface temperature of 550 degrees Fahrenheit (approximately 288° Celsius or 561 Kelvin).

The thermal insulation system of any of the preceding clauses wherein the aerospace duct and the thermal insulation system are located within a turbine engine that during at least a portion of a cycle of operation, experiences an atmospheric pressure of 80 kilopascals (11.6 PSI) or less.

The thermal insulation system of any of the preceding clauses wherein the composite having multiple layers comprises a first foil layer confronting the aerospace duct, an insulation layer confronting the first foil layer, a second foil layer confronting the insulation layer, and at least one infrared coating applied to any one of the layers.

The thermal insulation system of any of the preceding clauses wherein the at least one infrared coating comprises silica, alumina, titania, silicon, aluminum, titanium, tantalum, zirconium, yttrium, niobium, tungsten, molybdenum, iron, oxygen, germanium, zinc, sulfide, sulfur, selenide, calcium, fluorine, boron, gallium, arsenide, cadmium, telluride, cesium, bromide, iodide, chalcogenide glass, lithium, magnesium, fluoride, nickel, or copper.

The thermal insulation system of any of the preceding clauses wherein thermal conductivity of the at least one coating is within 40% of the insulation layer.

The thermal insulation system of any of the preceding clauses wherein the composite having multiple layers consists of a first foil layer confronting the aerospace duct, an insulation layer confronting the first foil layer, a film layer confronting the insulation layer, a second foil layer confronting the film layer, and at least one infrared coating applied to any one of the first foil layer, the insulation layer, the film layer, or the second foil layer.

The thermal insulation system of any of the preceding clauses wherein the at least one infrared coating is multiple thermal infrared coatings located on two or more faces of the first foil layer, the second foil layer, the film layer, or the insulation layer.

The thermal insulation system of any of the preceding clauses wherein the at least one infrared coating comprises silica, alumina, titania, silicon, aluminum, titanium, tantalum, zirconium, yttrium, niobium, tungsten, molybdenum, iron, oxygen, germanium, zinc, sulfide, sulfur, selenide, calcium, fluorine, boron, gallium, arsenide, cadmium, telluride, cesium, bromide, iodide, chalcogenide glass, lithium, magnesium, fluoride, nickel, or copper.

The thermal insulation system of any of the preceding clauses wherein the inclusion of the at least one infrared coating reduces a thickness of the insulation layer by 10%-40% while maintaining the thermal resistance or increasing the thermal resistance of the thermal insulation system 5%-40%.

The thermal wrap of any preceding clause wherein the first foil layer or the second foil layer comprises one or more of chromium, carbon, nitrogen, aluminum, silicon, sulfur, titanium, nickel, copper, selenium, niobium, molybdenum, iron, or stainless steel.

The thermal wrap of any preceding clause wherein the wherein the first foil layer or the second foil layer includes at least one dimple.

The thermal wrap of any preceding clause wherein the at least one infrared coating is located on at least one face of the first foil layer.

The thermal wrap of any preceding clause wherein the infrared coating reflects infrared radiation having wavelength range between and including 1.5 to 20 micrometers.

The thermal wrap of any preceding clause wherein the aerospace duct is located in a turbine engine.

What is claimed is:

1. A thermal insulation system for an aerospace duct through which high temperature fluid, greater than 500 F, passes, the thermal insulation system comprising:
    a first foil layer confronting the aerospace duct;
    an insulation layer confronting the first foil layer;
    a second foil layer confronting the insulation layer;
    at least one dimple included in the first foil layer; and
    at least one infrared coating applied to one or more of a first foil outer face of the first foil layer, an inner insulation face of the insulation layer or an outer insulation face of the insulation layer, and wherein one infrared coating of the at least one infrared coating contacts the at least one dimple;
    wherein at least one inner gas pocket is located at the at least one dimple and is defined by a first foil inner face of the first foil layer and an exterior wall of the aerospace duct.

2. The thermal insulation system of claim 1 wherein the at least one dimple includes a plurality of dimples in the first foil layer and a plurality of dimples in the second foil layer.

3. The thermal insulation system of claim 1 wherein the insulation layer includes a first material having a first emissivity and the at least one infrared coating includes a second material having a second emissivity, wherein the second emissivity is less than the first emissivity.

4. A thermal insulation system for an aerospace duct of a turbine engine, the turbine engine having an engine core surrounded by a core casing, wherein high temperature fluid, greater than 500 F, passes through the aerospace duct, the thermal insulation system comprising:
    a first foil layer confronting the aerospace duct through which the high temperature fluid flows, wherein the aerospace duct is located within the core casing of the engine core, the engine core comprising a compressor section, a combustion section, or a turbine section, wherein the aerospace duct is located at or extends between one or more of the compressor section, the combustion section, or the turbine section within the core casing;
    an insulation layer confronting the first foil layer;
    a second foil layer confronting the insulation layer;
    at least one dimple included in the first foil layer, wherein the at least one dimple defines at least one inner gas pocket between a first foil inner face of the first foil layer and an exterior wall of the aerospace duct; and
    at least one infrared coating applied to any one of the first foil layer, the insulation layer, or the second foil layer, wherein at least one infrared coating of the at least one infrared coating contacts the at least one dimple;
    wherein the first foil layer, the insulation layer, the second foil layer, and the at least one infrared coating define a composite having a thickness less than or equal to 0.6 inches (approximately 15.2 millimeters).

5. The thermal insulation system of claim 4, wherein the insulation layer includes fibers.

6. The thermal insulation system of claim 4 wherein the insulation layer comprises one or more of ceramic materials or fibers, silicate, fiberglass, oxygen, aluminum, silicon, titanium, zirconium, yttrium, iron, chromium, carbon, nitrogen, sulfur, nickel, copper, selenium, niobium, molybdenum, or stainless steel.

7. The thermal insulation system of claim 4 wherein the at least one infrared coating comprises one or more of silica, alumina, titania, silicon, aluminum, titanium, tantalum, zirconium, yttrium, niobium, tungsten, molybdenum, iron, oxygen, germanium, zinc, sulfide, sulfur, selenide, calcium, fluorine, boron, gallium, arsenide, cadmium, telluride, cesium, bromide, iodide, chalcogenide glass, lithium, magnesium, fluoride, nickel, or copper.

8. The thermal insulation system of claim 4 wherein thermal conductivity of the at least one infrared coating is within 40% of the insulation layer.

9. The thermal insulation system of claim 4 wherein the at least one infrared coating is multiple thermal infrared coatings located on two or more of a first foil inner face, a first foil outer face, an outer insulation face, an inner insulation face, a second foil inner face, or a second foil outer face.

10. The thermal insulation system of claim 4, further comprising at least one film layer between the second foil layer and the insulation layer or between the insulation layer and the first foil layer.

11. The thermal insulation system of claim 10 wherein the at least one film layer comprises at least one polyimide sheet.

12. A thermal insulation system for an aerospace duct of a turbine engine, the turbine engine having an engine core surrounded by a core casing, wherein high temperature fluid, greater than 500 F, passes through the aerospace duct, the thermal insulation system comprising:
  a first foil layer confronting the aerospace duct through which the high temperature fluid flows, wherein the aerospace duct is located within the core casing of the engine core, the engine core comprising a compressor section, a combustion section, or a turbine section, wherein the aerospace duct is located at or extends between one or more of the compressor section, the combustion section, or the turbine section within the core casing, the first foil layer having an emissivity between 0.1 and 0.4;
  an insulation layer confronting the first foil layer, wherein the insulation layer has an insulation thickness between 0.05 inches and 0.5 inches (approximately 1.2 millimeters to 12.7 millimeters);
  second foil layer confronting the insulation layer, the second foil layer having an emissivity between 0.1 and 0.4;
  at least one dimple included in the first foil layer or the second foil layer; and
  an infrared coating separate from the first foil layer, the second foil layer, and the insulation layer, the infrared coating being applied to any one of the first foil layer, the insulation layer, or the second foil layer, and located between the first foil layer and the second foil layer wherein:
    the infrared coating contacts the at least one dimple;
    the infrared coating has an emissivity at or between 0.0-0.4;
    the infrared coating reflects infrared radiation having a wavelength range of 0.7 micrometers to 1000 micrometers such that the infrared coating reflects infrared radiation not reflected by the first foil layer; and
    the infrared coating has a conductivity that is within 40% of a conductivity of the insulation layer,
  wherein the first foil layer, the insulation layer, the second foil layer, and the infrared coating define a composite having a thickness of between 0.1 inches and 0.6 inches (approximately 2.5 millimeters to 15.2 millimeters).

13. The thermal insulation system of claim 12 wherein the aerospace duct and the thermal insulation system are located within a turbine engine that during at least a portion of a cycle of operation, experiences an atmospheric pressure of 80 kilopascals (11.6 PSI) or less.

14. The thermal insulation system of claim 12 wherein the infrared coating is multiple thermal infrared coatings located on two or more of a first foil inner face, a first foil outer face, an outer insulation face, an inner insulation face, a second foil inner face, or a second foil outer face.

15. The thermal insulation system of claim 12 wherein the at least one dimple defines a pocket between a first foil outer face and an inner insulation face, or a second foil inner face and an outer insulation face.

16. The thermal insulation system of claim 12 wherein the at least one dimple is a plurality of dimples defined by a sinusoidal profile of the first foil layer or the second foil layer.

17. The thermal insulation system of claim 12, wherein the infrared coating includes a coating thickness at or between 0.0001 inches to 0.010 inches (approximately 2.5 micrometers to 254 micrometers).

18. The thermal insulation system of claim 12, wherein the second foil layer defines a radially outermost portion of the thermal insulation system, with respect to a center of the aerospace duct.

19. The thermal insulation system of claim 12, wherein the first foil layer defines a radially innermost portion of the thermal insulation system, with respect to a center of the aerospace duct.

* * * * *